US011551452B2

United States Patent
Leppänen et al.

(10) Patent No.: US 11,551,452 B2
(45) Date of Patent: Jan. 10, 2023

(54) APPARATUS AND METHOD FOR ASSOCIATING IMAGES FROM TWO IMAGE STREAMS

(71) Applicant: NOKIA TECHNOLOGIES OY, Espoo (FI)

(72) Inventors: Jussi Leppänen, Tampere (FI); Arto Lehtiniemi, Lempäälä (FI); Antti Eronen, Tampere (FI); Juha Arrasvuori, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/045,625

(22) PCT Filed: Mar. 29, 2019

(86) PCT No.: PCT/IB2019/052620
§ 371 (c)(1),
(2) Date: Oct. 6, 2020

(87) PCT Pub. No.: WO2019/193475
PCT Pub. Date: Oct. 10, 2019

(65) Prior Publication Data
US 2021/0158049 A1  May 27, 2021

(30) Foreign Application Priority Data

Apr. 6, 2018 (EP) .................................... 18166045

(51) Int. Cl.
*G06V 20/40* (2022.01)
*G06K 9/62* (2022.01)
(Continued)

(52) U.S. Cl.
CPC .......... *G06V 20/46* (2022.01); *G06K 9/6217* (2013.01); *G06T 7/20* (2013.01); *G06V 40/176* (2022.01);
(Continued)

(58) Field of Classification Search
CPC ............................. G06F 16/9537; G06F 16/58
See application file for complete search history.

(56) References Cited

U.S. PATENT DOCUMENTS

2013/0179911 A1   7/2013  Dang et al.
2014/0181668 A1*  6/2014  Kritt ............. H04N 21/234318
                                                          715/719
(Continued)

FOREIGN PATENT DOCUMENTS

WO   WO 2005/101413 A1   10/2005

OTHER PUBLICATIONS

Office Action for European Application No. 18166045.7 dated Oct. 19, 2021, 7 pages.
(Continued)

*Primary Examiner* — Clifford Hilaire
(74) *Attorney, Agent, or Firm* — Alston & Bird LLP (57) ABSTRACT

An apparatus configured to, based on first imagery (301) of at least part of a body of a user (204), and contemporaneously captured second imagery (302) of a scene, the second imagery comprising at least a plurality of images taken over time, and based on expression-time information indicative of when a user expression of the user (204) occurs, provide a time window (303) temporally extending from a first time (t−1) prior to the time (t) of the expression-time information, to a second time (t−5) comprising a time equal to or prior to the first time (t−1), the time window (303) provided to identify at least one expression-causing image (305) from the plurality of images of the second imagery (302) that was
(Continued)

captured in said time window, and provide for recordal of the at least one expression-causing image (305) with at least one expression-time image (306) comprising at least one image from the first imagery (301).

19 Claims, 3 Drawing Sheets

(51) Int. Cl.
| | |
|---|---|
| *G06T 7/20* | (2017.01) |
| *H04N 5/232* | (2006.01) |
| *H04N 5/247* | (2006.01) |
| *H04N 5/262* | (2006.01) |
| *H04N 5/92* | (2006.01) |
| *G06V 40/20* | (2022.01) |
| *G06V 40/16* | (2022.01) |
| *G11B 27/031* | (2006.01) |
| *G11B 27/34* | (2006.01) |

(52) U.S. Cl.
CPC ............ *G06V 40/20* (2022.01); *G11B 27/031* (2013.01); *G11B 27/34* (2013.01); *H04N 5/23293* (2013.01); *H04N 5/247* (2013.01); *H04N 5/2624* (2013.01); *H04N 5/9205* (2013.01); *G06T 2207/20084* (2013.01); *G06T 2207/30201* (2013.01); *G06V 20/44* (2022.01)

(56) References Cited

U.S. PATENT DOCUMENTS

2015/0262000 A1    9/2015   Huo et al.
2017/0099519 A1*   4/2017   Dang ............... H04N 21/44008

OTHER PUBLICATIONS

First Examination Report for Indian Application No. 202047047996 dated Sep. 24, 2021, 7 pages.
Extended European Search Report for European Application No. 18166045.7 dated Oct. 17, 2018, 11 pages.
Hideo, J. et al., "Looking at the viewer: Analysing Facial Activity to Detect Personal Highlights of Multimedia Contents", Multimedia Tools and Applications, Kluwer Academic Publishers, BO, vol. 51, No. 2, dated (Oct. 28, 2010) pp. 505-523.
International Search Report and Written Opinion for Application No. PCT/IB2019/052620 dated Jun. 26, 2019.

* cited by examiner

| 500 | based on first imagery comprising imagery being captured of at least part of a body of a user, and contemporaneously captured second imagery comprising imagery of a scene, wherein the first imagery is captured by a first camera of a device and the second imagery is captured by a second camera of the same device, the second imagery comprising at least a plurality of images taken over time, and based on expression-time information indicative of when a user expression of the user is determined to have occurred in the first imagery, |
|---|---|
| 501 | providing a time window temporally extending from a first time comprising a predetermined reaction time prior to the time indicated in the expression-time information, to a second time comprising a time equal to or prior to the first time, the time window provided to identify at least one expression-causing image from the plurality of images of the second imagery that was captured in said time window, and providing for association and recordal of the at least one expression-causing image with at least one expression-time image comprising at least one image from the first imagery based on the time indicated in the expression-time information |

Figure 6

APPARATUS AND METHOD FOR ASSOCIATING IMAGES FROM TWO IMAGE STREAMS

CROSS-REFERENCE TO RELATED APPLICATIONS

This application is a national phase entry of International Application No. PCT/IB2019/052620, filed Mar. 29, 2019, which claims priority to European Application No. 18166045.7, filed Apr. 6, 2018, the entire contents of which are incorporated herein by reference.

TECHNICAL FIELD

The present disclosure relates to the field of image and video capture. The present disclosure also relates to associated apparatus, methods and computer programs. Certain disclosed aspects/examples relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, smartwatches and tablet PCs.

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture functions (e.g. using a (e.g. in-built) digital camera), and gaming functions.

BACKGROUND

Electronic devices are becoming more and more ubiquitous, with users interacting with electronics in many different ways. For example, people carry portable electronic devices with them in the form of smartphones, tablet computers, laptops, smart-watches and e-book readers.

It is common for electronic devices, such as smartphones or other portable electronic devices, to comprise at least two cameras. A first camera may be configured to point towards the user and is typically mounted on the front of the device (termed a front facing camera) and a second camera may be configured to point away from the user and is typically mounted on the back of the device (termed a rear facing camera). In one or more examples, both the first and second cameras may be used to capture still images or video imagery contemporaneously for generation of composite images or video content comprising content captured from both cameras.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In an aspect of the disclosure there is provided an apparatus, the apparatus comprising means configured to based on first imagery comprising imagery being captured of at least part of a body of a user, and contemporaneously captured second imagery comprising imagery of a scene, wherein the first imagery is captured by a first camera of a device and the second imagery is captured by a second camera of the same device, the second imagery comprising at least a plurality of images taken over time, and based on expression-time information indicative of when a user expression of the user is determined to have occurred in the first imagery, provide a time window temporally extending from a first time comprising a predetermined reaction time prior to the time indicated in the expression-time information, to a second time comprising a time equal to or prior to the first time, the time window provided to identify at least one expression-causing image from the plurality of images of the second imagery that was captured in said time window, and provide for association and recordal of the at least one expression-causing image with at least one expression-time image comprising at least one image from the first imagery based on the time indicated in the expression-time information.

In one or more examples, the user expression comprises one or more of:
a change in a facial expression of the user;
a movement of a hand of the user to their face;
turning away of a face of the user from the first camera.

In one or more examples, the at least one expression-time image comprises one image of the first imagery, and the at least one expression-causing image comprises one image of the second imagery.

In one or more examples, the first imagery comprises first video imagery and the expression-time image comprises expression-time video imagery comprising a portion of the first video imagery, and wherein the second imagery comprises second video imagery and the at least one expression-causing image comprises expression-causing video imagery comprising a portion of the second video imagery.

In one or more examples, said apparatus includes means configured to provide for one or both of,
creating a composite image comprising the associated and recorded at least one expression-causing image and the at least one expression-time image configured for presentation together at one of the same time or consecutively; and
presenting the associated and recorded at least one expression-causing image and the at least one expression-time image on a user interface for review by a user.

In one or more examples, the time window is sized to identify one expression-causing image.

In one or more examples, the means is configured to identify a subset of candidate images comprising the plurality of images of the second imagery captured within the time window, the at least one expression-causing image identified from the subset of candidate images by an automated event identification process.

In one or more examples, the automated event identification process comprises one or both of:
a process of identifying one or more objects appearing in the subset of candidate images and tracking their movement to identify the occurrence of one or more events based on predetermined criteria, and
a process comprising the use of convolutional neural networks trained to identify one or more events that occurs in the subset of candidate images;

wherein the determined occurrence of the event provides for identification of the at least one expression-causing image.

In one or more examples, the means are configured to, based on eye tracking information indicative of where in the scene the user was looking over time, provide said time window and the eye tracking information from the same time period covered by the time window to said automated event identification process to identify the at least one expression-causing image.

In one or more examples, the first imagery comprises one or more images based on a live stream of imagery of the face of the user and thereby the expression-time information comprises live information indicative of when an occurrence of a user expression of the user is determined to have occurred in the first imagery, and the second imagery comprises a plurality of images of the scene based on a live stream of imagery of the scene, wherein a buffer is configured to store the most recently received images from the live stream, wherein the time window is configured to temporally extends from the first time comprising a predetermined reaction time prior to the time indicated in the expression-time information to the second time comprising a time based on a size of the buffer prior to the time indicated in the expression-time information.

In one or more examples, the means are configured to, based on the expression-time information being indicative of a plurality of user expressions of the user and a plurality of associated pairs of at least one expression-causing image with at least one expression-time image, provide for display of the associated pairs for selection and recordal based on user input.

In one or more examples, the contemporaneous capture of the first imagery and the second imagery is based on user input.

In one or more examples, the predetermined reaction time comprises a reaction time of the user determined from analysis of previously captured first and second imagery.

In a further aspect there is provided a method, the method comprising:
based on first imagery comprising imagery being captured of at least part of a body of a user, and contemporaneously captured second imagery comprising imagery of a scene, wherein the first imagery is captured by a first camera of a device and the second imagery is captured by a second camera of the same device, the second imagery comprising at least a plurality of images taken over time, and based on expression-time information indicative of when a user expression of the user is determined to have occurred in the first imagery,
providing a time window temporally extending from a first time comprising a predetermined reaction time prior to the time indicated in the expression-time information, to a second time comprising a time equal to or prior to the first time, the time window provided to identify at least one expression-causing image from the plurality of images of the second imagery that was captured in said time window, and
providing for association and recordal of the at least one expression-causing image with at least one expression-time image comprising at least one image from the first imagery based on the time indicated in the expression-time information.

In a further aspect there is provided a computer readable medium comprising computer program code stored thereon, the computer readable medium and computer program code being configured to, when run on at least one processor, perform the method of:
based on first imagery comprising imagery being captured of at least part of a body of a user, and contemporaneously captured second imagery comprising imagery of a scene, wherein the first imagery is captured by a first camera of a device and the second imagery is captured by a second camera of the same device, the second imagery comprising at least a plurality of images taken over time, and based on expression-time information indicative of when a user expression of the user is determined to have occurred in the first imagery,
providing a time window temporally extending from a first time comprising a predetermined reaction time prior to the time indicated in the expression-time information, to a second time comprising a time equal to or prior to the first time, the time window provided to identify at least one expression-causing image from the plurality of images of the second imagery that was captured in said time window, and
providing for association and recordal of the at least one expression-causing image with at least one expression-time image comprising at least one image from the first imagery based on the time indicated in the expression-time information.

In a further example aspect there is provided an apparatus comprising:
at least one processor; and
at least one memory including computer program code,
the at least one memory and the computer program code configured to, with the at least one processor, cause the apparatus to perform at least the following:
based on first imagery comprising imagery being captured of at least part of a body of a user, and contemporaneously captured second imagery comprising imagery of a scene, wherein the first imagery is captured by a first camera of a device and the second imagery is captured by a second camera of the same device, the second imagery comprising at least a plurality of images taken over time, and based on expression-time information indicative of when a user expression of the user is determined to have occurred in the first imagery,
provide a time window temporally extending from a first time comprising a predetermined reaction time prior to the time indicated in the expression-time information, to a second time comprising a time equal to or prior to the first time, the time window provided to identify at least one expression-causing image from the plurality of images of the second imagery that was captured in said time window, and
provide for association and recordal of the at least one expression-causing image with at least one expression-time image comprising at least one image from the first imagery based on the time indicated in the expression-time information.

The present disclosure includes one or more corresponding aspects, examples or features in isolation or in various combinations whether or not specifically stated (including claimed) in that combination or in isolation. Corresponding means and corresponding functional units (e.g., function enabler, image capturer, user expression determiner, image recorder, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Figure 1:
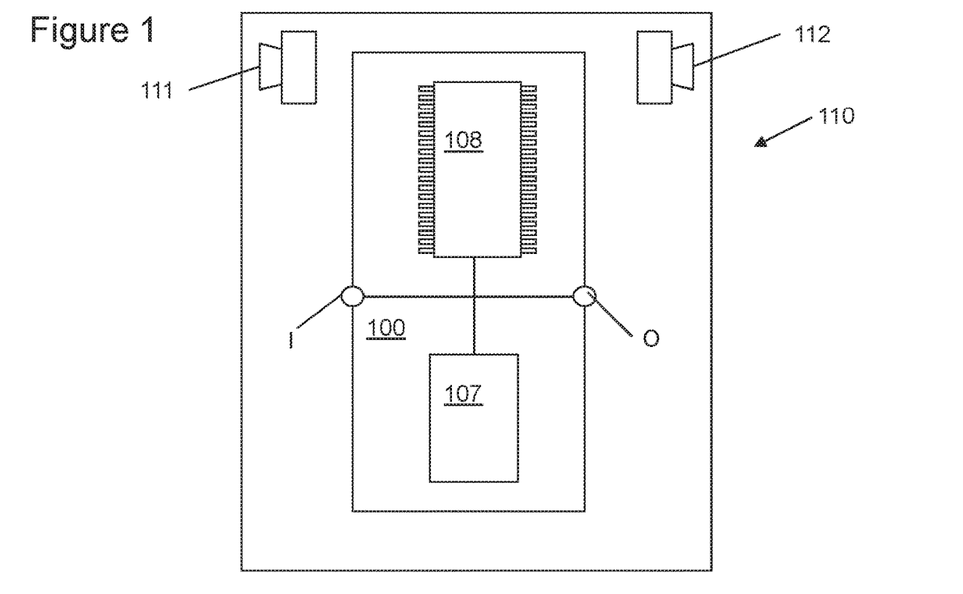
FIG. 1 illustrates an example apparatus for associating one or more images from first imagery and one or more images from second imagery.

Electronic devices 110 and, in particular, portable electronic devices such as mobile telephones, including smartphones, may be provided with at least two cameras, typically comprising a first, front facing camera 111 and a second, rear facing camera 112. In one or more examples, both the first and second cameras 111, 112 may be used to capture still or video imagery contemporaneously for generation of composite content comprising the still or video content captured from both cameras. The composite content may be configured to present the still or video imagery from the first camera and the second camera in one or more of a side by side arrangement, a vertically stacked arrangement or a picture in picture arrangement, consecutively or in any other arrangement in which the video imagery is displayed together. Such composite content, given the first and second cameras 111, 112 typically point 30 outwardly from a user and towards a user, may be used, in one or more examples described herein, to capture action occurring around the user as well as the reaction of the user, i.e. their facial expression at witnessing the action, at the same time. In other examples, the first and second cameras may be pointed towards first action occurring in a first part of a room or space in which a user is present and second action occurring at the same time but in a different, second part of a room or space.

FIG. 1 shows an apparatus 100 comprising memory 107, a processor 108, input I and output O. In this embodiment only one processor and one memory are shown but it will be appreciated that other embodiments may utilise more than one processor and/or more than one memory (e.g. same or different processor/memory types).

In this embodiment the apparatus 100 is an Application Specific Integrated Circuit (ASIC) for a portable electronic device with a touch sensitive display. In other embodiments the apparatus 100 can be a module for such a device, or may be the device itself, wherein the processor 108 is a general purpose CPU of the device and the memory 107 is general purpose memory comprised by the device.

The input I allows for receipt of signalling to the apparatus 100 from further components, such as components of a portable electronic device 110 (like a touch-sensitive or hover-sensitive display) or the like. The output O allows for onward provision of signalling from within the apparatus 100 to further components such as a display screen, speaker, or vibration module. In this embodiment the input I and output O are part of a connection bus that allows for connection of the apparatus 100 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single unit.

As mentioned above the apparatus 100 may be part of a portable electronic device 110 having first and second cameras 111, 112 for capturing first imagery and second imagery respectively. The portable electronic device 110 may comprise a display device such as, for example, a liquid crystal display (LCD), e-Ink or touch-screen user interface. The device 110 may be configured such that it may receive, include, and/or otherwise access data. For example, the device 110 may comprises a communications unit, such as a receiver, transmitter, and/or transceiver, in communication with an antenna for connecting to a wireless network and/or a port (not shown) for accepting a physical connection to a network, such that data may be received via one or more types of networks. It will be appreciated that, in certain example embodiments, the display device may incorporate the user interface.

For devices 110 that include two cameras 111, 112, a camera mode may be provided that provides for contemporaneous capture by both the first and second cameras 111, 112 (and any other cameras in one or more examples), which may be known as a "bothie" mode. Such a contemporaneous capture mode may be used to record photographs, i.e. still images, or videos, simultaneously from both cameras. The resulting composite images or videos comprise the front and back camera content configured for display side-by-side, vertically stacked, picture-in-picture or any other arrangement. In one or more examples, the arrangement may be dependent on the device/camera orientation at the time of capture.

One use of the contemporaneous capture mode or "bothie" mode is to see the reaction of the person taking a photograph or video (e.g. taken by the first camera 111) to something they see happening in a scene that is captured by the backwards facing camera 112. It will be appreciated that the scene refers to anything that is captured contemporaneously with the capture of the reaction of the person. Accordingly, the scene may comprise another person, a landscape, an object, or anything else that may be imaged. The images or video of the scene and the person's reaction can then be presented in the composite image or video based on the images or video taken by the two cameras 111, 112. It will be appreciated that the contemporaneous capture mode or "bothie" mode may be used in other situations, such as to capture actions and reactions of one or more persons in the scene and not necessarily the user capturing the scene with the device 110.

In some cases, the action happening in the scene captured by the rear-facing facing camera 112, for example, is such that it happens quickly or perhaps occurs unexpectedly. In such cases, the reaction of the user taking the image or video will happen later in time than the action that caused the reaction, which is captured by the rear-facing camera 112. This is, of course, due to the non-zero reaction time of the user taking the image or video. Now, since in the contemporaneous capture "bothie" mode, the front-facing and rear-facing camera images are taken at the same time, either the reaction (e.g. of the user) or the action that caused the reaction will not be present in a contemporaneously captured pair of images. This is a problem when contemporaneously capturing two or more images or videos from different cameras for presentation together. The "action" may comprise any occurrence happening in the scene.

Figure 2:
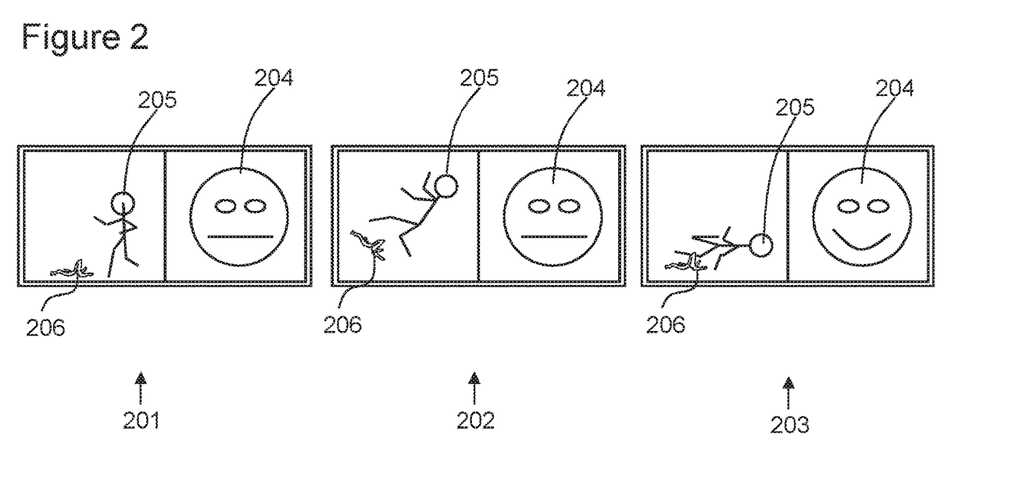
FIG. 2 shows an example series of events that may be viewable by first and second cameras of a device.

With reference to example FIG. 2, a series of image pairs 201, 202, 203 show what is visible at corresponding consecutive time points to the rear-facing and front-facing cameras 111, 112. The scene visible to the rear-facing camera 112 is shown in the left-hand image of each pair 201, 202, 203 and the face of the user of the device visible to the front-facing camera 111 is shown in the right-hand image of each pair. Example FIG. 2 shows an example where the user 204 may be taking an image/video of his friend 205 running. The friend 205 slips unexpectedly on a banana peel 206 at the time represented by image pair 202. The user 204 reacts to the slip, after his reaction time, and therefore at a later time as represented in the third image pair 203. A pair of contemporaneously captured images may show the friend 205 slipping but no reaction of the user 204, as represented in image pair 202 or may show the friend 205 after the slip has occurred and with a reaction of the user 204, as represented in image pair 203. However, a composite image of contemporaneously captured images will not show both the friend 205 slipping (i.e. in image pair 202) and the reaction of the user 205 to friend slipping (i.e. in the later image pair 203).

Figure 3:
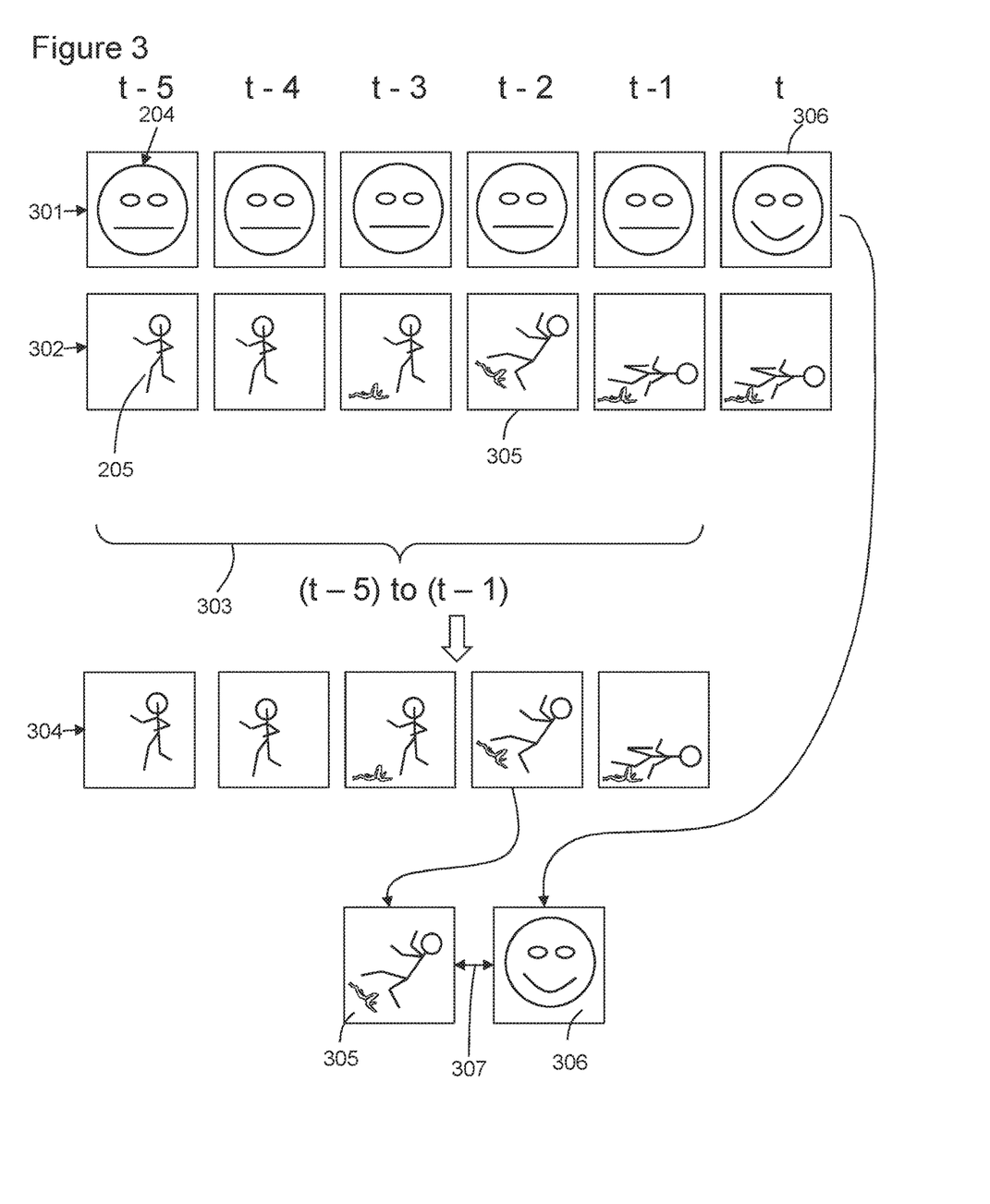
FIG. 3 shows a diagram illustrating how the association of images may be performed.

Example FIG. 3 shows images visible to or captured by the front-facing and rear-facing cameras 111, 112 to illustrate an example operation of the apparatus 100 to associate images or video from the two cameras 111, 112 for generation of an advantageous composite image or video.

First imagery 301 is representative of what is seen by the first, front-facing, camera 111 over time. Second imagery 302 is representative of what is seen by the second rear-facing camera 112 over time. The images of the first and second imagery are shown at a series of consecutive time points, which may represent the rate at which the device 100 captures images or receives images from the camera feed i.e. what the respective camera currently sees. The right-most images of the first and second imagery 301, 302 show the most recent image at current time "t" and the images to the left shown previously seen/captured images at times t−1, t−2, t−3, t−4 and t−5 extending into the recent past relative to the current time, t. Based on initiation of a contemporaneous capture mode or "bothie" mode the imagery from the first and second cameras may be processed in different ways to achieve different end results. For example, the desired composite content obtained from the first and second cameras 111, 112 may comprise a composite still image or a composite video.

Example FIG. 3 shows the first imagery 301 comprising images captured of a face of the user 204. The first imagery 301 may comprise a plurality of images, such as the images between t−5 to t, or just the most recent image or images, such as at time t or at time t and t−1. The number of time-spaced images that comprise the first imagery may depend on whether the intended end product is a composite still image or a composite video. In one or more examples, the first imagery need not be of the face of the user and instead may be of only a part of the face or a different part of the user's body, such as a hand, arm, leg or foot among others.

As described later, the first imagery 301 may be used to determine the occurrence of a reaction of the user 204 and therefore only the most recent images of the first imagery may be sufficient to identify a change in facial expression. For example, an expression status (e.g. smile, shock, etc) may be determined after each image and a change in expression may be determined from a change in expression status. In other examples, a greater number of images may be used over a corresponding greater recent past time period to identify facial expression changes. It will be appreciated that the first imagery 301 may be representative of a series of still images for possible use in the creation of a composite still image or the first imagery 301 may be representative of some or all of the frames of video imagery for possible use in the creation of a composite video.

Thus, depending on the intended end result, the first imagery 301 may comprise one image, two images or a plurality of images, which may be used to provide a still image or frames of video imagery. If the intended end result of the "bothie" mode is a composite still image, then the first imagery 301 may comprise only the most recent image, which may be stored in a first imagery buffer. The buffer may be accessed for facial expression analysis. If the facial expression analysis yields a result comprising a change in expression, the image of first imagery 301 may be copied from the buffer for forming a composite "bothie" still image. If the intended end result of the bothie mode is a video, then the first imagery 301 may comprise a plurality of images comprising video frames of the video imagery, which may be stored in the buffer. One or more of the images may be provided for facial expression analysis. If the facial expression analysis yields a result comprising a change in expression, the video frames may be copied from the buffer for forming a composite "bothie" video. The frames selected for inclusion in the video may comprise a first predetermined number of frames prior to the change in facial expression and, optionally, a second predetermined number of frames after the change in facial expression.

Example FIG. 3 also shows second imagery 302 comprising images captured by the second, rear-facing in this example, camera 112 and comprises, in this example, imagery of the friend 205.

The second imagery may comprise a plurality of images captured at time spaced intervals that are at least temporarily stored in a second imagery buffer. The number of images that comprise the second imagery 302 may depend on the intended end result. If the intended result of the "bothie" mode is a still image, then the second imagery 302 may comprise a plurality of images comprising a limited number of the most recently captured images, such as in the last predetermined number of seconds. The example of FIG. 3 shows such an example. In other examples, such as if the intended end result of the bothie mode is a video, then the second imagery 302 may comprise a greater number of images, such as several seconds, minutes or hours of video frames of the video imagery, which may be stored in the second imagery buffer.

As mentioned in relation to FIG. 2, the user 204 is witnessing the scene captured by the second camera 112. The scene may be witnessed directly by looking directly at the friend 205 or indirectly by looking at the images captured by the second camera 112 that may be displayed on a display.

The apparatus 100 may be configured to receive or have access to expression-time information. The expression time information is indicative of when a user expression of the user 204 is determined to have occurred in the first imagery 301. The user expression, in this example, comprises a change in a facial expression. Thus, in the example of FIG. 3, the expression-time information may comprise time t because in the first imagery 301, at time t relative to time t−1, the user 204 reacts by smiling.

The expression-time information may be determined based on any suitable facial expression analysis. In one or more examples, the apparatus 100 may be configured to provide the first imagery 301 to a facial expression analysing block (shown in FIG. 4 and described below). Alternatively, facial expression analysing block may receive the first imagery 301 without the action of the apparatus 100, such as direct from the first camera 111.

In one or more other examples, the user expression comprises movement of the user's hand. For example, the expression-time information may be determined based on the user's hand moving to their face, or any other user reaction that comprises a hand, arm or leg gesture. Thus, the user expression may comprise any one or more of a change in a facial expression of the user, a movement of a hand of the user to their face or to any other part of their body, the turning away or towards of a face of the user from the first camera. In the description that follows, the user expression is described based on a change in facial expression, but it will be appreciated that the expression-time information may be based on any one or more other user expressions that may be determined as a reaction to an occurrence in the scene captured in the second imagery.

A change in facial expression may be determined by a face detection algorithm configured to determine when the configuration of facial features of the user changes, such as in accordance with predetermined criteria. The turning away or turning towards of a user's face to the camera may be determined by a face detection algorithm configured to determine a rotation angle of a user's face relative to the camera, such as based on a predetermined model or data of facial features. Thus, a change in rotation angle above a threshold may be interpreted as turning towards/away. In one or more other examples, the apparatus may be configured to use neural networks trained to identify such facial changes in expression/angle. In one or more other examples, the apparatus may be configured to use algorithms configured to identify other body parts to identify the occurrence of movements of those body parts. For example, a hand detection, leg detection or arm detection algorithm may be used to identify the body parts in the first imagery and determine movements of those body parts that meet predetermined criteria to qualify as a "user reaction". Again, in one or more examples, the apparatus may be configured to use neural networks trained to identify such body part movements.

Based on the expression time information, the apparatus is configured to provide a time window 303. The time window 303, depending on its size, may be used to identify one of the images that comprise the second imagery or a plurality of images that comprise the second imagery.

The time window 303 is configured to temporally extend from a first time to a second time. The first time is determined based on a predetermined reaction time and the expression time information. In this example, the predetermined reaction time is representative of the average time it takes a person, such as the user 204, to react to an occurrence, which in this example is one time unit. It will be appreciated that the predetermined reaction time may be set to an integer multiple of the period at which consecutive images are captured. The second time may be based on one or more factors, such as the size of the second imagery buffer, the determined frequency with which determined occurrences of action happen or any other factor.

In a first example or in one or more examples, the time window 303 is configured to temporally extend from the first time comprising a predetermined reaction time (=1 time unit, for example) prior to the time (t) indicated in the expression-time information and therefore the first time comprises t−1. The second time comprises a time equal to or prior to the first time, which in this and one or more examples is based on the size of the second imagery buffer. Accordingly, the second time comprises t−5. The time window 303 therefore extends from t−1 to t−5 in this example. The images from the second imagery 302 that fall within the time window 303, may thus be identified as expression-causing images, as shown at 304. These expression-causing images may represent frames of a short video that may form a composite video with one or more images from the first imagery 301.

In a second or one or more other examples, the time window may be configured to identify one expression-causing image from the second imagery 302. Thus, in another example the predetermined reaction time may be two time units and thus the first time of the window 303 may be t−2. The second time of the time window may be defined as equal to the first time and therefore the window may specify time t−2. Such a time window thereby identifies image 305 as an expression-causing image. It will be appreciated that an image captured at a time nearest to that defined by the time window may be identified if the predetermined reaction time is not exactly synchronised with the capture rate of the imagery.

In the second or one or more examples, the images from the second imagery 302 that fall within the time window 303, may be termed candidate images and may be sent for further analysis or further analysis may be performed on them by the apparatus 100, as will be described below. The further analysis may provide for the identification of at least one expression-causing image from the second imagery 302. It may be computationally efficient to trigger the process of "action detection" based on the expression-time information derived from facial expression recognition.

Regardless of whether the apparatus is configured to use the window 303 itself or the further analysis to define the at least one expression-causing image from the plurality of images of the second imagery 302, the apparatus 100 comprises means configured to provide for association of the at least one expression-causing image 305 with at least one expression-time image 306 comprising at least one image from the first imagery 301 based on the time indicated in the expression-time information (i.e. "t" in this example).

Thus, to summarise, the apparatus 100 comprises means configured to

- based on contemporaneously captured first imagery 301 and second imagery 302, the first imagery 301 captured by a first camera 111 of a device 110 and comprising imagery of a face 204 of a user, and the second imagery 302 captured by a second camera 112 of the same device 110 and comprising imagery of a scene (i.e. a scene including the friend 205) witnessed by the user at a time of capture, the second imagery 302 comprising at least a plurality of images taken over time, and based on expression-time information indicative of when a user expression, which may comprise a change in a facial expression of the user, is determined to have occurred in the first imagery 301;
- provide a time window 303 temporally extending from a first time (t−1) comprising a predetermined reaction time (equal to one time unit) prior to the time indicated in the expression-time information (i.e. "t"), to a second time comprising a time equal to or prior to the first time (t−5 in this example), the time window provided to identify at least one expression-causing image 304 or 305 from the plurality of images of the second imagery 302 that was captured in said time window 303, and
- provide for association 307 of the at least one expression-causing image 304 or 305 with at least one expression-time image 306 comprising at least one image from the first imagery 302 based on the time indicated in the expression-time information.

This may be advantageous because one or more expression-time images from the first imagery may be associated with one or more expression-causing images from the second imagery wherein there is a temporal offset between when the images were captured. This may provide an advantageous composite image or video when the associated images or video are combined to form the composite image/video. Thus, based on said association, the apparatus 100 may be configured to provide for recordal of a composite image comprising the associated at least one expression-causing image and the at least one expression-time image configured for presentation together at one of the same time or consecutively. Accordingly, on play back of the composite image or video the expression-causing image(s) and the expression-time images(s) are presented together at the same time or consecutively.

In one or more examples, the "bothie" mode may be configured to provide for generation of a composite image or video from the associated expression-causing image(s) and the expression-time image(s), based on a first occurrence of determined reaction as defined in the expression-time information. Thus, with the bothie mode active, the apparatus 100 may be configured to await a reaction as defined in the expression-time information and then exit the bothie mode. Accordingly, once a reaction is determined, the at least one expression-causing image 304 or 305 and the at least one expression-time image 306 can be associated and, optionally, the composite image or video generated.

In one or more other examples, the "bothie" mode may be configured to be active for a predetermined active time period (such as until user-input to exit the bothie mode) and during the active time the apparatus 100 may be configured to provide for the making of an association between expression-causing image(s) and the expression-time image(s) for each occurrence of a determined reaction as defined in the expression-time information. Thus, with the bothie mode active, the apparatus may make a plurality of associations in one or more examples.

In one or more examples, based on the one or more associations, the apparatus 100 may be configured to provide for recording of a corresponding number of a composite images or videos comprising the associated expression-causing image(s) and expression-time image(s) configured for presentation together at one of the same time or consecutively.

In one or more examples, based on the one or more associations, the apparatus 100 may be configured to present the associated expression-causing image(s) and the expression-time image(s) on a user interface for review by the user or a different user. Accordingly, the apparatus 100 may be configured to record the composite image(s) or video(s) based on user input to select which of the composite or associated images or videos the user wishes to record and which they wish to discard.

As mentioned above, in one or more examples, the images from the second imagery 302 that fall within the time window 303, may be termed candidate images and may be sent for further analysis. The further analysis may be configured to identify the occurrence of an event that may have caused the user reaction. The at least one expression-causing image 305 may therefore be identified from the subset of candidate images 304 by an automated event identification process.

In one or more examples the automated event identification process comprises a process of identifying one or more objects (e.g. the person or friend 205) appearing in the candidate images 304 and tracking their movement to identify the occurrence of an event based on predetermined criteria. For example, the object appearing in the candidate images may be identified as a person. How a person typically moves may be characterised by predetermined data. The action of the person slipping on the banana peel may be classified as unexpected movement of the person and, accordingly, one or more images from the candidate images may be identified that is associated with said unexpected movement.

In other examples, changes in the appearance in the scene may be measured without identifying particular objects. If there are changes in the scene above a threshold amount of change, then this may provide for the identification of at least one expression-causing image 305 from the subset of candidate images 304.

In one or more examples, the automated event identification process comprises a process comprising the use of convolutional neural networks trained to identify an event that occurs in the candidate images 304. Accordingly, neural networks may be trained on imagery that includes preidentified marked events and the neural network may thus be configured, through said training, to identify events in new imagery defined by said window 304.

Thus, as shown in example FIG. 3, the image 305 has been selected from the candidate images 304 by said automated event identification process.

In one or more examples, the automated event identification process may identify a plurality of events in the subset or candidate images 304. Accordingly, the apparatus 100 may be configured to use eye tracking information configured to determine where in the scene the user 204 was looking. Thus, a correlation between one of the plurality of identified events and the eye tracking information may identify one or more images from the candidate images that includes the event that the user reacted to by way of the facial expression in image 306.

Thus, based on eye tracking information indicative of where in the scene the user 204 was looking over time, the apparatus 100 may be configured to provide said time window 303, or the images identified therefrom, and the eye tracking information from the same time period (t−5 to t−1) covered by the time window 303 to identify the at least one expression-causing image. Thus, the automated event identification process may use the eye tracking information with the automatic event analysis to identify the one or more expression-causing image for said association.

In the examples described herein the first imagery comprises image(s) from a live stream, i.e. current, imagery of the face of the user 204 captured by the camera 111 and provided for the apparatus 100. Accordingly, the expression-time information comprises live information indicative of when a change in the facial expression of the user is determined to have occurred in the first imagery 301.

Further, the second imagery 302 is captured contemporaneously with the first imagery 301 and thus the second imagery comprises a plurality of images of the scene from a live stream, i.e. imagery captured by the second camera 112 and provided to the apparatus. The imagery from the live streams may be buffered. Accordingly, the second imagery 302 may comprise imagery captured in a recent time period, the recent time period extending a time determined by the size of the buffer to hold the imagery from the stream.

Thus, the time window 303 temporally extends from the first time comprising a predetermined reaction time prior to the time indicated in the expression-time information to the second time comprising a time based on the size of the buffer prior to the time indicated in the expression-time information. In this example, the buffer holds six images as shown at 302 in example FIG. 3. It will be appreciated that the second imagery buffer for storing the second imagery may be larger or smaller.

As mentioned above, the bothie mode may be used to capture videos from the first and second cameras and, accordingly, the first imagery 301 may comprise first video imagery and thus the at least one expression-time image comprises expression-time video imagery comprising at least a portion of the first video imagery based on the time indicated in the expression-time information. Further, in one or more examples, the second imagery may comprise second video imagery and the at least one expression-causing image may comprise expression-causing video imagery comprising at least a portion of the second video imagery. Thus, the expression-time video imagery and the expression-causing video imagery may be extracted from the first video imagery and the second video imagery 301, 302 respectively and modified to include a temporal offset relative one another configured to temporally align a frame 305 in which the determined action occurs with a frame 306 in which the user reaction occurs. Accordingly, on creation of the composite video, the user's reaction at 306 will be visible at the same time in the composite video as the action at 305 to which they are reacting.

In one or more examples, the predetermined reaction time may be set as a shorter than average reaction time e.g. 1 time unit based on the apparatus being configured to define a time window that will include all possible imagery that the user could have reacted to e.g. from t−1 to t−5 for further event analysis. In one or more examples, the predetermined reaction time may be set as an average reaction time e.g. 2 time units based on the apparatus 100 being configured to use the time window 303, e.g. extending over only t−2, to directly identify the image 305. Thus, using the time window 303 in this way with an average reaction time is more likely to identify the correct image of the second imagery 302.

In one or more examples, the predetermined reaction time comprises a reaction time of the user 204 determined from analysis of previously captured first and second imagery. Thus, the apparatus may be configured to tailor the predetermined reaction time based on how quickly the user was determined to react in previous first and second imagery 301, 302.

For contemporaneously captured first and second imagery, time stamps in the first and second imagery may provide for identification of corresponding time points related to when the content was captured.

Figure 4:
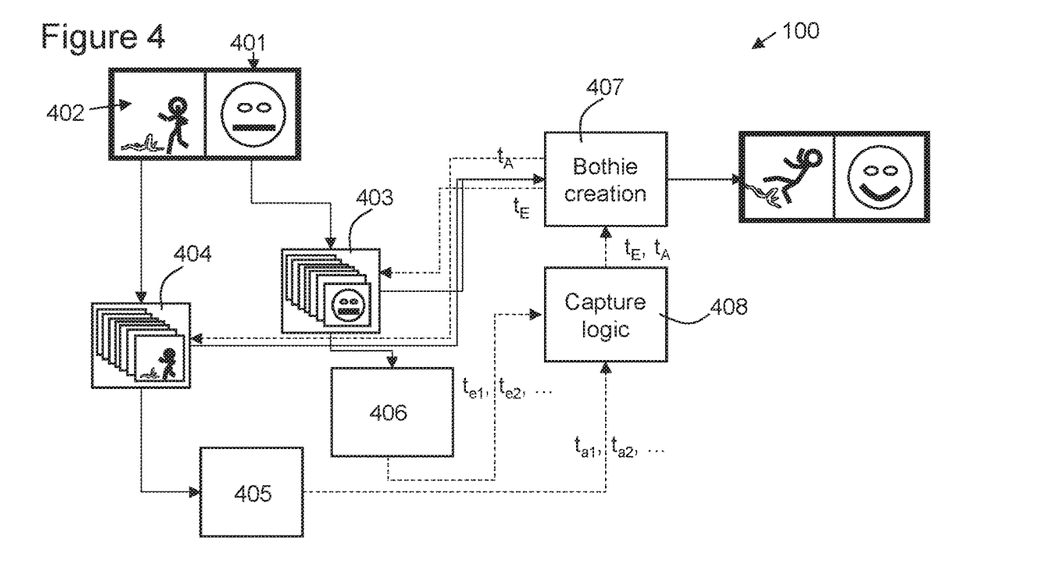
FIG. 4 shows an example block diagram of the functional units of an example apparatus.

Example FIG. 4 shows an example block diagram of the apparatus 100. The face of the user 204 for capture by the first camera 111 is shown at 401. The scene for capture by the second camera 112 is shown at 402.

When the user starts the "bothie" mode, the apparatus 100 may begin to keep a first buffer 403 of an image(s) from the front-facing camera 111 and a second buffer 404 of the images from the rear-facing camera 112. The length of one or both of the buffers 403, 404 may be of the order of a few seconds. The first buffer 403 is optional.

The apparatus 100 may include an automated event identification block 405 that may be configured to receive the imagery from the second buffer 404. In one or more examples, the second buffer 404 is constantly being added to, such as on a first-in-first-out basis, with a stream of images from the camera 112. Whenever a new image is added to the second buffer 404, the automated event identification process may be run to detect an event or "action". The detection may be done using well-known techniques. As mentioned above, in one or more examples, the block 405 may be configured to first detect and track objects of interest (people, for example) in the image using deep convolutional neural networks trained for the purpose. The use of Convolutional Neural Network for action detection and segmentation in videos is a technique that will be familiar to those skilled in the art. The output of this block 405 may comprise a list of times ($t_{a1}$, $t_{a2}$, . . . ) or image identifiers of second imagery defining when or which images of the second imagery contain an identified "action" done by a detected object of interest. It will be appreciated that the automated event identification may be performed as imagery is provided to the second buffer 404 or in response to a change in user expression or the definition of a time window 303, as mentioned above. Thus, the automated event identification block 405 may be configured to transition from an inactive state to an active state based on the change in user expression or the definition of a time window 303.

The apparatus 100 may include a facial expression analysis block 406. The task of the facial expression analysis block 406 is to detect changes in the facial expression of the user. In one or more examples, the facial expression analysis block 406 may comprise, more generally, a user expression analysis block 406 configured to identify changes in facial expression and/or any other bodily reaction of the user, as described above. The analysis may be performed directly on the stream of images from the front camera 111 or from the first buffer 403. The output of the facial expression analysis block 406 is expression-time information which may comprise times ($t_{e1}$, $t_{e2}$, . . . ) of expression changes, i.e. reactions of the user 204 to the events in the scene, and which may be used to provide a signal to the camera 111 to take the front camera image at this point in time (such as in the case of no front camera buffer). The facial expression detection may be performed with known methods. The images or references thereto that correspond to the times of the expression-time information may be passed to a bothie creation block 407.

In one or more examples, in which the automated event identification block 405 provides for identification of action as second imagery is received, the time that action is determined to have occurred is provided to the facial expression analysis block 406 to define a subsequent time period in which a user reaction may occur. This may be computationally efficient as the facial expression analysis block 406 may be provided with a cue to identify a reaction. In one or more examples, one or more thresholds used by the facial expression analysis block 406 to determine the occurrence of a reaction may be temporarily modified within a predetermined period after the time of the action identified by the automated event identification block 405. In one or more examples, this may help identify subtle reactions.

In some examples, there may be several actions happening in the second imagery. Thus, it may not be clear to which action the user is reacting to. To help in this regard, the apparatus 100 may include a gaze tracking block (not shown). The gaze tracking block may perform gaze tracking based on the images from the first camera 111. Using the resultant gaze tracking information, the apparatus 100 may be configured to determine which direction the user was looking during each of his detected reactions. This information may be used to limit the area of the second imagery that is used for the event identification. Thus, the apparatus 100 may be configured, based on gaze tracking information indicative of where in the scene the user was looking at the time of a change in facial expression, provide for automated event identification on a subset of a spatial extent of the second imagery based on the gaze tracking information. This may be efficient.

The apparatus 100 may include a capture logic block 408. In one or more examples, the capture logic block 408 takes as input the times of the user reactions (i.e. facial expression changes defined in the expression-time information) and may define a time window to correlate those times with the times of actions received from the automated event identification block 405. The capture logic block 408 may then associate action-reaction pairs of images from the first imagery and the second imagery based on those times. In one or more examples, this may be performed as follows:

1. Go through all user reactions as determined by the facial expression analysis block 406.
2. For every expression change or "reaction", find from the input of the automated event identification block 405 an action that happened before the user reaction. The capture logic block 408 is configured to use the time window 303 so that only determined events happening at least a predetermined reaction time $t_{rt}$ and at most a time ti before the expression change or "reaction" are considered. $t_{rt}$ is the predetermined reaction time of the user and ti is a maximum time difference between the occurrence of the event in the second imagery or "action" and the expression change or "reaction" and is in the range of a few seconds. In one or more examples, the apparatus 100 may identify a plurality of possible expression-causing images in the time window and may be configured to identify an expression-causing image based on which of the possible expression-causing occurred closest in time to the time of the change in facial expression.
3. Accordingly, for each identified pair of event occurrence times and times indicated by the expression-time information from the block 406, provide for association of the corresponding expression-causing image(s) and expression-time image(s) (if any).

The "bothie" creation block 407 may be configured to receive the associated action-reaction pairs comprising the times or identifiers for the expression-causing image(s) and expression-time image(s) or the images themselves. Thus, in one or more examples, the block 407 may fetch the expression-causing image(s) and expression-time image(s) from the first and second imagery, which may be present in the first and second buffers 403, 404, as shown by lines $t_A$ and $t_E$, where $t_A$ and $t_E$ are indicative of the times of the identified expression-causing image(s) and expression-time image(s) respectively. These images are then used to create the composite image or video. In one or more examples, such as when a plurality of actions were identified in the time window or a plurality of times were identified in the expression-time information, the apparatus 100 may be configured to provide a user interface for user selection. The block 407 may be configured to create the composite image or video based on which associated images the user selects.

Figure 5:
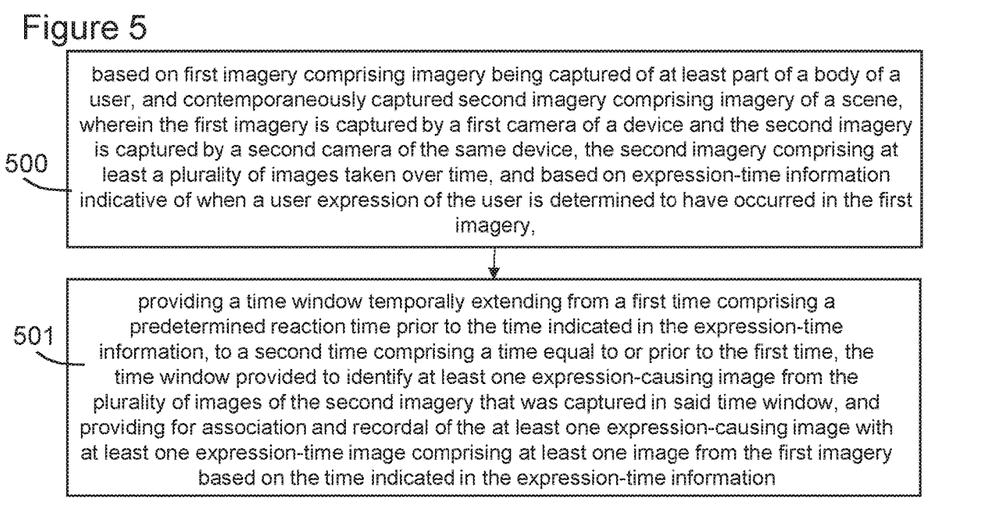
FIG. 5 shows a flowchart illustrating an example method.

FIG. 5 shows a flow diagram illustrating the steps of, based on first imagery comprising imagery being captured of at least part of a body of a user, and contemporaneously captured second imagery comprising imagery of a scene, wherein the first imagery is captured by a first camera of a device and the second imagery is captured by a second camera of the same device, the second imagery comprising at least a plurality of images taken over time, and based on expression-time information indicative of when a user expression of the user is determined to have occurred in the first imagery, providing a time window temporally extending from a first time comprising a predetermined reaction time prior to the time indicated in the expression-time information, to a second time comprising a time equal to or prior to the first time, the time window provided to identify at least one expression-causing image from the plurality of images of the second imagery that was captured in said time window, and providing for association and recordal of the at least one expression-causing image with at least one expression-time image comprising at least one image from the first imagery based on the time indicated in the expression-time information.

Figure 6:
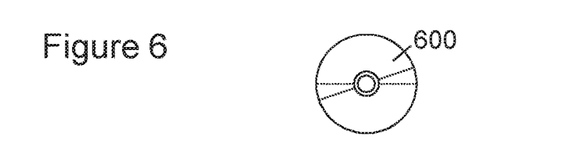
FIG. 6 shows a computer readable medium.

FIG. 6 illustrates schematically a computer/processor readable medium 600 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus, the apparatus comprising:
   at least one processor; and
   at least one memory including computer program code,
   the at least one memory and the computer program code configured to, with the at least one processor, cause the apparatus to perform at least the following:
   based on first imagery comprising imagery of at least part of a body of a user, and second imagery comprising imagery of a scene, wherein the first imagery is captured by a first camera of a device and the second imagery is contemporaneously captured by a second camera of the same device, the second imagery comprising at least a plurality of images taken over time, and based on expression-time information indicative of when a user expression of the user is determined to have occurred in the first imagery,
   provide a time window temporally extending from a first time comprising a predetermined reaction time prior to a time indicated in the expression-time information, to a second time comprising a time equal to or prior to the first time, the time window provided to identify at least one expression-causing image from the plurality of images of the second imagery that was captured in said time window, wherein the predetermined reaction time comprises a reaction time of the user that is based on an analysis of previously captured first and second imagery, and
   provide for association and recordal of the at least one expression-causing image with at least one expression-time image comprising at least one image from the first imagery based on the time indicated in the expression-time information.

2. The apparatus of claim 1, wherein the user expression comprises one or more of:
   a change in a facial expression of the user;

a movement of a hand of the user to their face; or
turning away of a face of the user from the first camera.

3. The apparatus of claim 1, wherein the at least one expression-time image comprises one image of the first imagery, and the at least one expression-causing image comprises one image of the second imagery.

4. The apparatus of claim 1, wherein the first imagery comprises first video imagery and the expression-time image comprises an image of expression-time video imagery comprising a portion of the first video imagery, and
wherein the second imagery comprises second video imagery and the at least one expression-causing image comprises an image of expression-causing video imagery comprising a portion of the second video imagery.

5. The apparatus of claim 1, wherein the at least one memory and the computer program code are further configured to, with the at least one processor, cause the apparatus to provide for one or both of,
creating a composite image comprising the associated at least one expression-causing image and the at least one expression-time image configured for presentation together at one of the same time or consecutively; and
presenting the associated at least one expression-causing image and the at least one expression-time image on a user interface for review by a user.

6. The apparatus of claim 1, wherein the time window is sized to identify one expression-causing image.

7. The apparatus of claim 1, wherein the at least one memory and the computer program code are further configured to, with the at least one processor, cause the apparatus to identify a subset of candidate images comprising the plurality of images of the second imagery captured within the time window, the at least one expression-causing image identified from the subset of candidate images by an automated event identification process.

8. The apparatus of claim 7, wherein the automated event identification process comprises one or both of:
a process of identifying one or more objects appearing in the subset of candidate images and tracking their movement to identify the occurrence of one or more events based on predetermined criteria, and
a process comprising the use of convolutional neural networks trained to identify one or more events that occurs in the subset of candidate images;
wherein the determined occurrence of the event provides for identification of the at least one expression-causing image.

9. The apparatus of claim 7, wherein based on eye tracking information indicative of where in the scene the user was looking over time, the at least one memory and the computer program code are further configured to, with the at least one processor, cause the apparatus to provide said time window and the eye tracking information from the same time period covered by the time window to said automated event identification process to identify the at least one expression-causing image.

10. The apparatus of claim 1, wherein
the first imagery comprises one or more images based on a live stream of imagery of the face of the user and thereby the expression-time information comprises live information indicative of when a user expression of the user is determined to have occurred in the first imagery, and
the second imagery comprises a plurality of images of the scene based on a live stream of imagery of the scene, wherein a buffer is configured to store the most recently received images from the live stream,
wherein the time window is configured to temporally extend from the first time comprising a predetermined reaction time prior to the time indicated in the expression-time information to the second time comprising a time based on a size of the buffer prior to the time indicated in the expression-time information.

11. The apparatus of claim 10, wherein based on the expression-time information being indicative of a plurality of occurrences of user expressions of the user and a plurality of associated pairs of at least one expression-causing image with at least one expression-time image, the at least one memory and the computer program code are further configured to, with the at least one processor, cause the apparatus to provide for display of the associated pairs for selection and recordal based on user input.

12. The apparatus of claim 1, wherein the contemporaneous capture of the first imagery and the second imagery is based on user input.

13. A method, the method comprising:
based on first imagery comprising imagery of at least part of a body of a user, and second imagery comprising imagery of a scene, wherein the first imagery is captured by a first camera of a device and the second imagery is contemporaneously captured by a second camera of the same device, the second imagery comprising at least a plurality of images taken over time, and based on expression-time information indicative of when a user expression of the user is determined to have occurred in the first imagery,
providing a time window temporally extending from a first time comprising a predetermined reaction time prior to a time indicated in the expression-time information, to a second time comprising a time equal to or prior to the first time, the time window provided to identify at least one expression-causing image from the plurality of images of the second imagery that was captured in said time window, wherein the predetermined reaction time comprises a reaction time of the user that is based on an analysis of previously captured first and second imagery; and
providing for association and recordal of the at least one expression-causing image with at least one expression-time image comprising at least one image from the first imagery based on the time indicated in the expression-time information.

14. A computer readable medium comprising computer program code stored thereon, the computer readable medium and computer program code being configured to, when run on at least one processor, perform a method of:
based on first imagery comprising imagery of at least part of a body of a user, and second imagery comprising imagery of a scene, wherein the first imagery is captured by a first camera of a device and the second imagery is contemporaneously captured by a second camera of the same device, the second imagery comprising at least a plurality of images taken over time, and based on expression-time information indicative of when a user expression of the user is determined to have occurred in the first imagery,
providing a time window temporally extending from a first time comprising a predetermined reaction time prior to a time indicated in the expression-time information, to a second time comprising a time equal to or prior to the first time, the time window provided to identify at least one expression-causing image from the plurality of images of the second imagery that was captured in said time window, wherein the predetermined reaction time comprises a reaction time of the user that is based on an analysis of previously captured first and second imagery; and providing for association and recordal of the at least one expression-causing image with at least one expression-time image comprising at least one image from the first imagery based on the time indicated in the expression-time information.

15. The method of claim 13, further comprising one or both of:

creating a composite image comprising the associated at least one expression-causing image and the at least one expression-time image configured for presentation together at one of the same time or consecutively; and presenting the associated at least one expression-causing image and the at least one expression-time image on a user interface for review by a user.

16. The method of claim 13, wherein the time window is sized to identify one expression-causing image.

17. The method of claim 13, further comprising identifying a subset of candidate images comprising the plurality of images of the second imagery captured within the time window, the at least one expression-causing image identified from the subset of candidate images by an automated event identification process.

18. The method of claim 17, wherein the automated event identification process comprises one or both of:

a process of identifying one or more objects appearing in the subset of candidate images and tracking their movement to identify the occurrence of one or more events based on predetermined criteria, and a process comprising the use of convolutional neural networks trained to identify one or more events that occurs in the subset of candidate images;

wherein the determined occurrence of the event provides for identification of the at least one expression-causing image.

19. The method of claim 17, further comprising, based on eye tracking information indicative of where in the scene the user was looking over time, providing said time window and the eye tracking information from the same time period covered by the time window to said automated event identification process to identify the at least one expression-causing image.

* * * * *